US008687484B2

(12) United States Patent
Kim et al.

(10) Patent No.: US 8,687,484 B2
(45) Date of Patent: Apr. 1, 2014

(54) METHOD AND APPARATUS FOR PERFORMING COMMUNICATION IN RELAY SYSTEM

(75) Inventors: Hak Seong Kim, Anyang-si (KR); Han Byul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 13/395,426

(22) PCT Filed: Sep. 9, 2010

(86) PCT No.: PCT/KR2010/006150
§ 371 (c)(1),
(2), (4) Date: Mar. 9, 2012

(87) PCT Pub. No.: WO2011/031080
PCT Pub. Date: Mar. 17, 2011

(65) Prior Publication Data
US 2012/0170510 A1   Jul. 5, 2012

Related U.S. Application Data

(60) Provisional application No. 61/240,669, filed on Sep. 9, 2009.

(51) Int. Cl.
*H04L 12/26* (2006.01)
*H04B 7/204* (2006.01)
*H04W 4/00* (2009.01)
*H04W 72/00* (2009.01)

(52) U.S. Cl.
USPC ........... 370/229; 370/319; 370/329; 370/344; 455/450

(58) Field of Classification Search
USPC ................. 370/229–253, 310–350; 455/414.1–427, 431–466
See application file for complete search history.

(56) References Cited

U.S. PATENT DOCUMENTS

| 8,400,906 | B2 * | 3/2013 | Lee et al. ...................... 370/206 |
| 8,514,768 | B2 * | 8/2013 | Noh et al. .................... 370/315 |
| 8,576,755 | B2 * | 11/2013 | Doan et al. .................... 370/281 |
| 2008/0186899 | A1 | 8/2008 | Zhu et al. |
| 2008/0233967 | A1 * | 9/2008 | Montojo et al. ........... 455/452.2 |
| 2011/0170458 | A1 * | 7/2011 | Chen et al. .................... 370/279 |
| 2012/0069793 | A1 * | 3/2012 | Chung et al. .................. 370/315 |

OTHER PUBLICATIONS

CMCC, "Considerations on Relay backhaul and Relay-specific RS", R1-091564, 3GPP TSG RAN WG1 Meeting #56bis, Mar. 2009.

(Continued)

*Primary Examiner* — Tri H Phan
(74) *Attorney, Agent, or Firm* — Lee, Hong, Degerman, Kang & Waimey

(57) ABSTRACT

The present invention relates to a method and apparatus for efficiently using a resource in a relay system. In detail, the present invention relates to a method for controlling an uplink signal transmission of user equipment in a wireless communication system, and to an apparatus for same. The method comprises the following steps: checking a cell-specific first SRS transmission subframe set; checking a relay-specific second SRS transmission subframe set; and allocating a resource for the uplink signal transmission. The uplink signal is transmitted to a relay via a backhaul subframe in the event the backhaul subframe falls within the first SRS transmission subframe set but does not fall within the second SRS transmission subframe set. The uplink signal transmission is dropped from the backhaul subframe in the event the backhaul subframe falls within the second SRS transmission subframe set.

20 Claims, 12 Drawing Sheets

(56) References Cited

OTHER PUBLICATIONS

Catt et al., "UL Backhaul Subframe for Type I Relay in LTE-A", R1-092779, 3GPP TSG RAN WG1 Meeting #57-bis, Jun. 2009.

LG Electronics Inc., "Backhaul subframe allocation for HARQ operation", R1-091195, TSG-RAN WG1 Meeting #56bis, Mar. 2009.

* cited by examiner

METHOD AND APPARATUS FOR PERFORMING COMMUNICATION IN RELAY SYSTEM

CROSS-REFERENCE TO RELATED APPLICATIONS

This application is the National Stage filing under 35 U.S.C. 371 of International Application No. PCT/KR2010/006150, filed on Sep. 9, 2010, which claims the benefit of U.S. Provisional Application Ser. No. 61/240,669, filed on Sep. 9, 2009, the contents of which are all incorporated by reference herein in their entirety.

FIELD OF THE INVENTION

The present invention relates to a wireless communication system, and more particularly to a method and apparatus for efficiently using communication resources in a relay system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DETAILED DESCRIPTION OF THE INVENTION

Technical Problem

An object of the present invention devised to solve the problem lies on a method and apparatus for efficiently using communication resources in a wireless communication system such as a relay system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for controlling uplink signal transmission of a user equipment (UE) in a wireless communication system including confirming a cell-specific first sounding reference signal (SRS) transmission subframe set; confirming a relay-specific second SRS transmission subframe set; and allocating resources for the uplink signal transmission. If a backhaul subframe is contained in the first SRS transmission subframe set and is not contained in the second SRS transmission subframe set, the uplink signal is transmitted to the relay through the backhaul subframe, and if the backhaul subframe is contained in the second SRS transmission subframe set, transmission of the uplink signal is dropped in the backhaul subframe.

In another aspect of the present invention, a user equipment (UE) for use in a wireless communication system includes a radio frequency (RF) unit; a memory; and a processor. The processor confirms a cell-specific first sounding reference signal (SRS) transmission subframe set, confirms a relay-specific second SRS transmission subframe set, and allocates resources for the uplink signal transmission. If a backhaul subframe is contained in the first SRS transmission subframe set and is not contained in the second SRS transmission subframe set, the uplink signal is transmitted to the relay through the backhaul subframe, and if the backhaul subframe is contained in the second SRS transmission subframe set, transmission of the uplink signal is dropped in the backhaul subframe.

The uplink signal may include acknowledgement/negative ACK (ACK/NACK) or Sounding Reference Signal (SRS).

The uplink signal may be transmitted to the relay through a time interval located at the rear of the backhaul subframe. The uplink signal may include an SRS interval of the backhaul subframe.

In another aspect of the present invention, a method for controlling signal transmission/reception of a relay node (RN) in a wireless communication system includes confirming a cell-specific first sounding reference signal (SRS) transmission subframe set; and confirming a relay-specific second SRS transmission subframe set. If a backhaul subframe is contained in the first SRS transmission subframe set and is not contained in the second SRS transmission subframe set, a signal from a user equipment (UE) is received through the backhaul subframe, and if the backhaul subframe is contained in the second SRS transmission subframe set, a sounding reference signal (SRS) is transmitted to a base station (BS) through the backhaul subframe.

In yet another aspect of the present invention, a relay node (RN) for use in a wireless communication system includes a radio frequency (RF) unit; a memory; and a processor. The processor confirms a cell-specific first sounding reference signal (SRS) transmission subframe set, and confirms a relay-specific second SRS transmission subframe set. If a backhaul subframe is contained in the first SRS transmission subframe set and is not contained in the second SRS transmission subframe set, a signal from a user equipment (UE) is received through the backhaul subframe, and if the backhaul subframe is contained in the second SRS transmission subframe set, a sounding reference signal (SRS) is transmitted to a base station (BS) through the backhaul subframe.

The signal received from the user equipment (UE) may include acknowledgement/negative ACK (ACK/NACK) or Sounding Reference Signal (SRS).

The uplink signal may be transmitted to the relay node (RN) through a time interval located at the rear of the backhaul subframe. The uplink signal may include an SRS interval of the backhaul subframe.

The method may further include performing, if the backhaul subframe is contained in the first SRS transmission subframe set and is not contained in the second SRS transmission subframe set, switching from a backhaul link to an access link within the backhaul subframe. A signal on the backhaul link is transmitted to the base station (BS) using a shortened subframe format.

Effects of the Invention

As apparent from the above description, exemplary embodiments of the present invention have the following effects. The exemplary embodiments can allow communication resources to be efficiently used in a wireless communication system such as a relay system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. LTE-Advanced (LTE-A) is an evolved version of 3GPP LTE.

Although the following embodiments of the present invention will hereinafter describe inventive technical characteristics on the basis of the 3GPP system, it should be noted that the following embodiments will be disclosed only for illustrative purposes and the scope and spirit of the present invention are not limited thereto.

Figure 1:
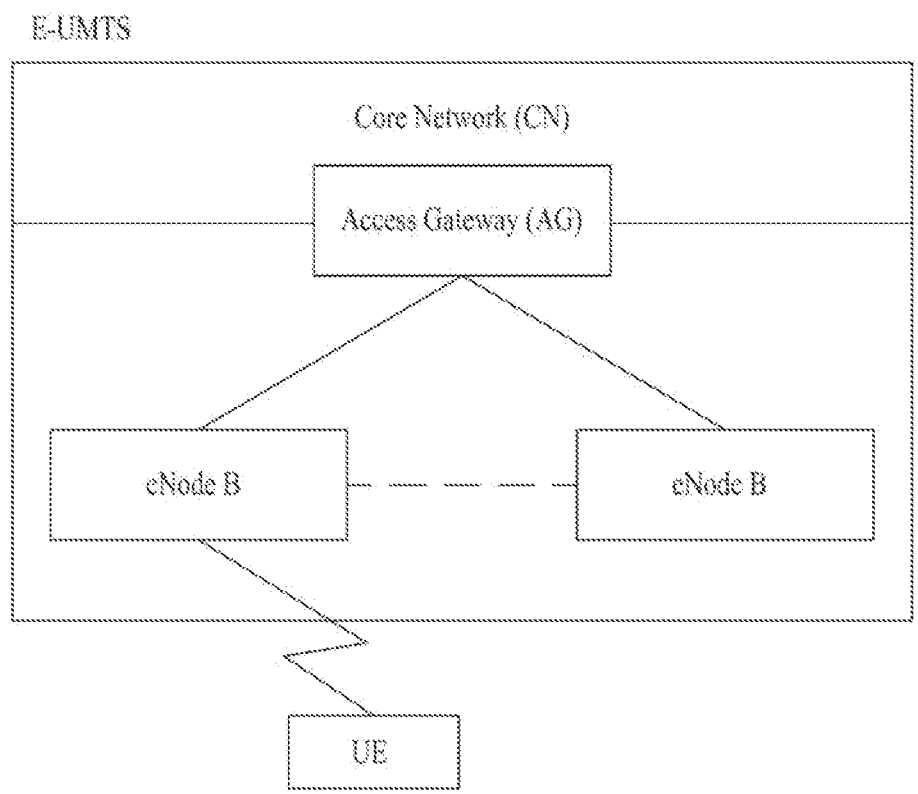
FIG. 1 exemplarily shows an Evolved Universal Mobile Telecommunications System (E-UMTS) network structure.

FIG. 1 exemplarily shows an E-UMTS network structure. The E-UMTS may also be referred to as an LTE system. A communication network is widely deployed to provide various communication services such as voice and packet data services.

As shown in FIG. 1, the E-UMTS network includes an Evolved Universal Terrestrial Radio Access Network (E-UTRAN), an Evolved Packet Core (EPC), and User Equipments (UEs). The E-UTRAN may include one or more eNode Bs (eNBs) 20 and one or more UEs 10 may be located per cell. One or more Mobility Management Entity/System Architecture Evolution (MME/SAE) gateways 30 may be located at an end of the network and connected to an external network. In this specification, the term "downlink" refers to communication from the eNB 20 to the UE 10 and the term "uplink" refers to communication from the UE 10 to the eNB 20.

The UE 10 is a communication device carried by a user and the eNB 20 is generally a fixed station that communicates with the UE 10. The eNB 20 provides end points of a user plane and a control plane to the UE 10. One eNB 20 may be located in each cell. An interface for transmitting user traffic or control traffic may be used between the eNBs 20. Each MME/SAE gateway 30 provides end points of session and mobility management functions to the UE 10. The eNB 20 and the MME/SAE gateway 30 can be connected to each other through an S1 interface.

The MME provides various functions including distribution of paging messages to eNBs 20, security control, idle state mobility control, SAE bearer control, encryption of non-access stratum (NAS) layer signaling, and integrity protection. An SAE gateway host provides various functions including completion of a plane packet and user plane switching for supporting mobility of the UE 10. The MME/SAE gateway 30 will also be simply referred to as a gateway in this specification although it includes MME and SAE gateways.

A plurality of nodes may be connected between a gateway 30 and an eNB 20 through an S1 interface. The eNBs 20 may be connected to each other through an X2 interface and neighbor eNBs may have a meshed network structure having the X2 interface.

Figure 2:
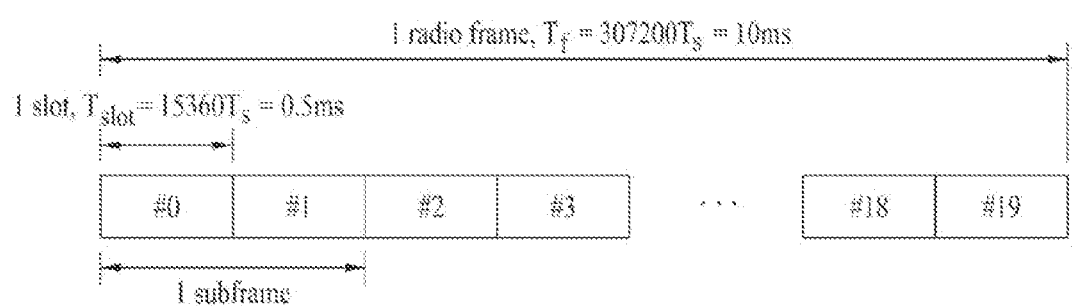
FIG. 2 exemplarily shows a radio frame structure for use in a 3rd Generation Partnership Project (3GPP) system.

FIG. 2 illustrates a radio frame structure for use in the 3GPP system.

Referring to FIG. 2, the radio frame has a length of 10 ms (327200×$T_s$) and includes 10 subframes of equal size. Each subframe has a length of 1 ms and includes two slots. Each slot has a length of 0.5 ms (15360*$T_s$). In this case, $T_s$ represents sampling time, and is expressed by '$T_s=1/(15 \text{ kHz} \times 2048)=3.2552 \times 10^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. The aforementioned structure of the radio frame is only exemplary, and various modifications can be made to the number of subframes contained in the radio frame or the number of slots contained in each subframe, or the number of OFDM symbols in each slot.

Figure 3:
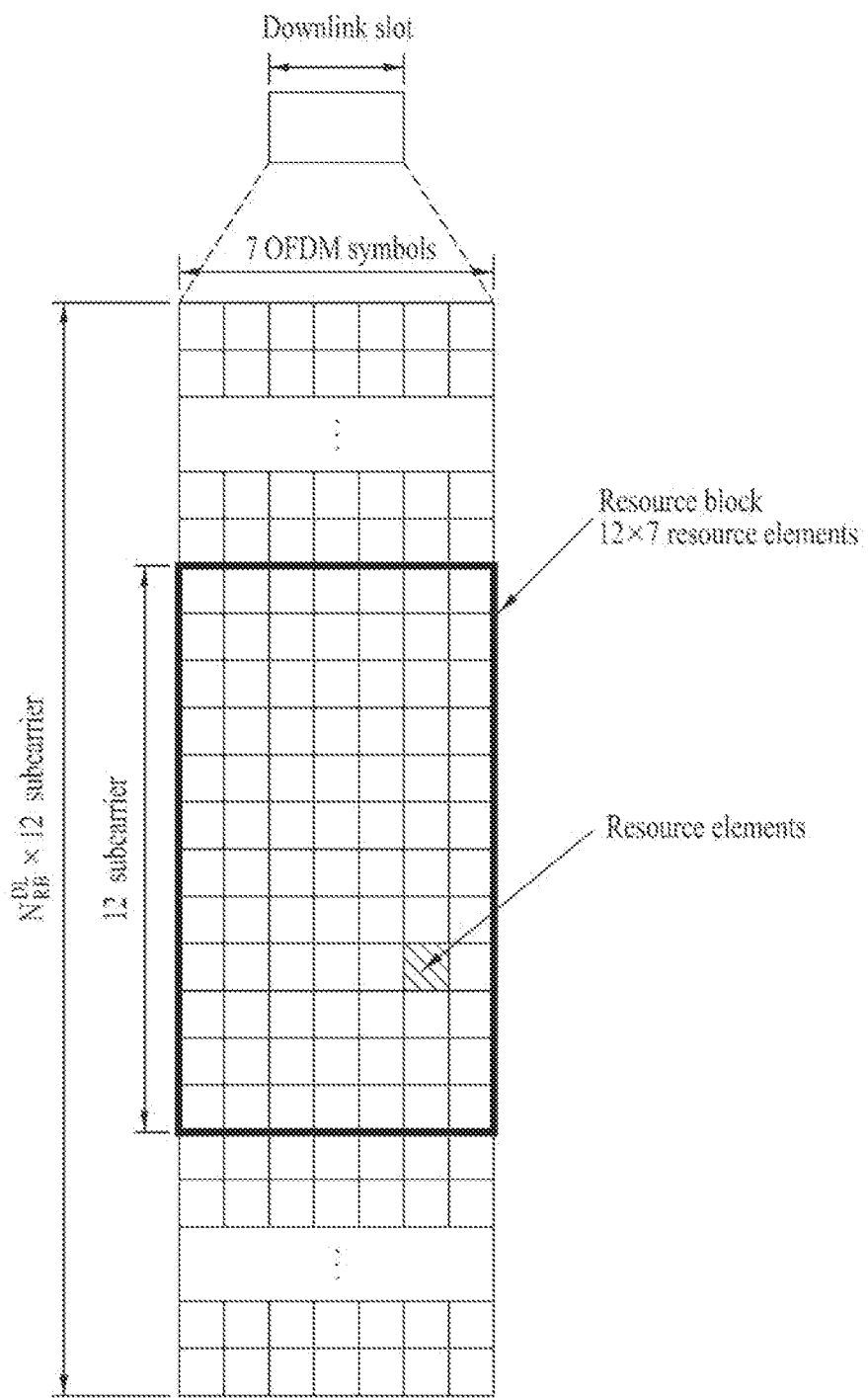
FIG. 3 exemplarily shows a resource grid of a downlink (DL) slot.

FIG. 3 illustrates a resource grid for a downlink slot.

Referring to FIG. 3, a downlink slot includes a plurality of OFDM symbols (for example, 7 OFDM symbols) in a time domain, and includes $N_{RB}^{DL}$ resource blocks in a frequency domain. Each resource block (RB) includes 12 subcarriers, such that a downlink slot includes ($N_{RB}^{DL} \times 12$) subcarriers. Although FIG. 3 illustrates that a downlink slot includes 7 OFDM symbols and a resource block (RB) includes 12 subcarriers, the scope or spirit of the present invention is not limited thereto and other examples can also be applied to the present invention. For example, the number of OFDM symbols contained in a downlink slot may be changed according to a Cyclic Prefix (CP) length. Each element on a resource grid may be defined as a resource element (RE). The RE represents minimum time/frequency resources defined in a physical channel, and is indicated by a single OFDM symbol index or a single subcarrier index. One RB may include ($N_{symb}^{DL} \times N_{sc}^{RB}$) resource elements (REs). $N_{symb}^{DL}$ is the number of OFDM symbols contained in a downlink slot, and $N_{sc}^{RB}$ is the number of subcarriers contained in a resource block (RB). The number ($N_{RB}^{DL}$) of RBs contained in a downlink slot is dependent upon a downlink transmission bandwidth established in a cell.

The downlink slot structure of FIG. 3 may be equally applied to an uplink slot structure. However, the uplink slot structure includes SC-FDMA symbols instead of OFDM symbols.

Figure 4:
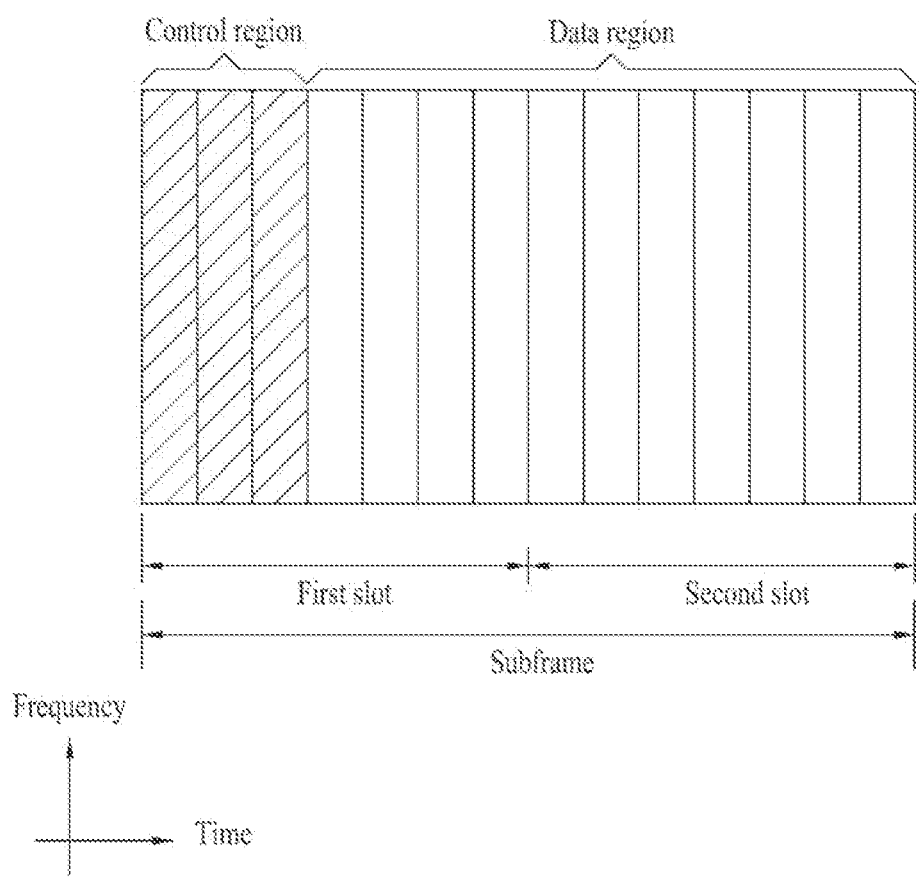
FIG. 4 exemplarily shows a downlink (DL) subframe structure.

FIG. 4 exemplarily illustrates a downlink subframe structure for use in a 3GPP system.

Referring to FIG. 4, one or more OFDM symbols located in the front of the subframe are used as a control region, and the remaining OFDM symbols are used as a data region. The size of the control region may be independently established for each subframe. The control region may be adapted to transmit scheduling information and other L1/L2 control information. The control channel includes a Physical Control Format Indicator CHannel (PCFICH), a Physical Hybrid-automatic repeat request (ARQ) Indicator CHannel (PHICH), a Physical Downlink Control CHannel (PDCCH), and the like. The traffic channel includes a Physical Downlink Shared CHannel (PDSCH).

PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the eNB and the UE may transmit and receive data other than either specific control information or specific service data through the PDSCH. Control information transmitted through the PDCCH is referred to as downlink control information (DCI). The DCI transports uplink resource allocation information, downlink resource allocation information, or uplink transmission power control (TPC) commands for UE groups. The eNB determines a PDCCH format according to a DCI to be sent to the UE, and attaches a Cyclic Redundancy Check (CRC) to control information. A unique identifier (e.g., Radio Network Temporary Identifier (RNTI)) is masked on the CRC according to PDCCH owners or utilities.

Figure 5:
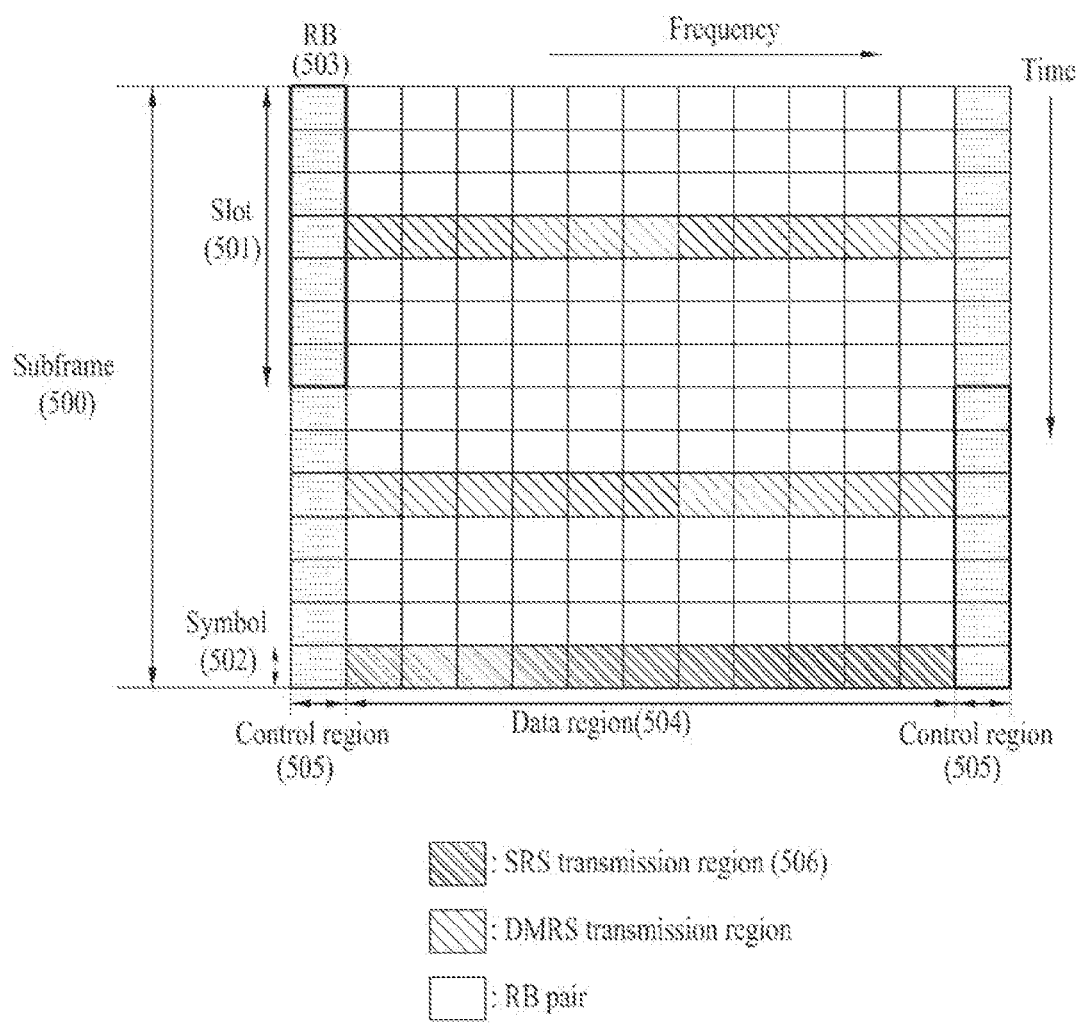
FIG. 5 exemplarily shows an uplink (UL) subframe structure for use in a system.

FIG. 5 exemplarily shows an uplink (UL) subframe structure for use in a 3GPP system.

Referring to FIG. 5, a subframe 500 having a length of 1 ms, which is a basic unit of LTE uplink transmission, includes two 0.5 ms slots 501. When assuming the length of a normal Cyclic Prefix (CP), each slot includes 7 symbols 502 and one symbol corresponds to one SC-FDMA symbol. A resource block 503 is a resource allocation unit corresponding to 12 subcarriers in a frequency domain and one slot in a time domain. The structure of the LTE uplink subframe is broadly divided into a data region 504 and a control region 505. The data region refers to a series of communication resources used for transmission of data such as voice and packets transmitted to each UE and corresponds to resources except for a control region in a subframe. The control region refers to a series of communication resources used for transmission of downlink channel quality report from each UE, reception ACK/NACK for a downlink signal, uplink scheduling request, and the like. A region 506 in which Sounding Reference Signals (SRSs) can be transmitted is a duration in which an SC-FDMA symbol located at the last portion on a time axis in one subframe is present and is transmitted through a data transmission band on a frequency axis. SRSs of several UEs transmitted to the last SC-FDMA of the same subframe can be identified according to frequency positions/sequences.

Figure 6:
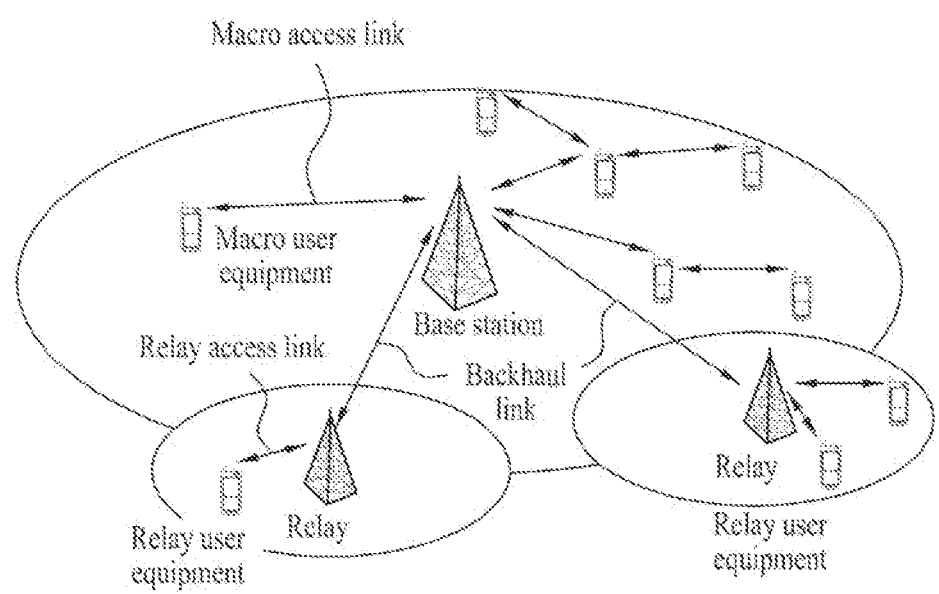
FIG. 6 exemplarily shows a wireless communication system including a relay.

FIG. 6 illustrates a wireless communication system having relays. A relay or Relay Node (RN) extends the service area of an eNB or is installed in a shadowing area to thereby provide a reliable service. Referring to FIG. 6, the wireless communication system includes an eNB, relays, and UEs. The UEs communicate with the eNB or the relays. For the sake of convenience, a UE communicating with an eNB is referred to as a macro UE and a UE communicating with a relay is referred to as a relay UE. A communication link between an eNB and a macro UE and a communication link between a relay and a relay UE are referred to as a macro access link and a relay access link, respectively. A communication link between an eNB and a relay is referred to as a backhaul link.

Relays are classified into L1 relays, L2 relays, and L3 relays according to their functionalities in multi-hop transmission. An L1 relay usually functions as a repeater. Thus, the L1 relay simply amplifies a signal received from an eNB or a UE and transmits the amplified signal to the UE or the BS. Because the L1 relay does not decode a received signal, the transmission delay of the signal is short. Despite this benefit, noise is also amplified because the L1 relay does not separate the signal from the noise. To avert this problem, an advanced repeater or smart repeater capable of UL power control or self-interference cancellation may be used. The operation of an L2 relay may be depicted as decode-and-forward. The L2 relay can transmit user-plane traffic to L2. While the L2 relay does not amplify noise, decoding increases transmission delay. An L3 relay whose operation is depicted as self-backhauling can transmit an Internet Protocol (IP) packet to L3. As it is equipped with a Radio Resource Control (RRC) function, the L3 layer serves as a small-size BS.

L1 and L2 relays may be regarded as part of a donor cell covered by a BS. In the case where a relay is part of a donor cell, the relay does not have a cell ID of its own cell ID because it cannot control its cell and UEs of the cell. Nonetheless, the relay may still have a relay ID. At least part of Radio Resource Management (RRM) is controlled by the eNB to which the donor cell belongs, while parts of the RRM may be located in the relay. An L3 relay can control cells of its own. Then the L3 relay may manage one or more cells and each of the cells may have a unique physical-layer cell ID. The L3 relay may have the same RRM mechanism as a BS. From the perspective of a UE, there is no difference between accessing a cell controlled by the L3 relay and accessing a cell controlled by a normal BS.

Relays may be classified as follows according to mobility.
Fixed RN: as is implied from its appellation, this type RN is permanently fixed for use in a shadowing area or for coverage extension. It may function as a simple repeater.

Nomadic RN: this type RN is temporarily installed when users are rapidly increasing in number, or is movable within a building.

Mobile RN: this RN can be installed in a public transportation vehicle such as a bus or the subway. The mobility of the RN should be supported.

The following classifications can also be considered according to the links between relays and networks.

In-based connection: a network-to-relay link shares the same frequency band with a network-to-UE link in a donor cell.

Out-band connection: a network-to-relay link and a network-to-UE link use different frequency bands in a donor cell.

With respect to the knowledge of the existence of a relay in a UE, relays are classified into the followings.

Transparent relay: a UE is not aware of whether or not it is communicating with a network via the relay.

Non-transparent relay: a UE is aware of whether or not it is communicating with a network via the relay.

Figure 7:
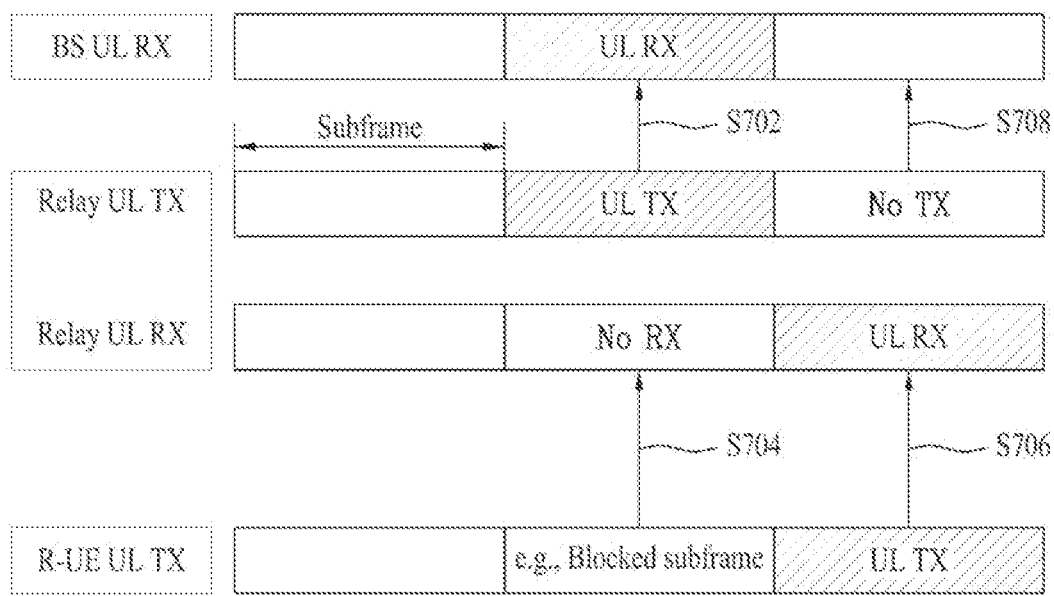
FIG. 7 exemplarily shows a communication process using a backhaul link and an access link.

FIG. 7 exemplarily shows a communication process using a backhaul link and an access link. If the relay is operated according to in-band connection, a backhaul link and an access link are operated according to a half-duplex scheme. According to the half-duplex scheme, the backhaul link and the access link are not simultaneously activated in the same transmission time interval (TTI). In case of the 3GPP system, TTI is defined on a subframe basis, such that only one of the backhaul link and the access link is activated on a subframe basis.

Referring to FIG. 7, if uplink backhaul subframe transmission is present at step S702, the relay does not receive PUCCH and PUSCH from a relay UE at the same subframe time point at step S704. Similarly, upon receiving PUCCH and PUSCH from the relay UE in step S706, the relay is unable to transmit an uplink backhaul subframe to an eNB at step S708. The half-duplex operation may cause serious limitation to subframe resources available for a backhaul link and an access link. In case of signals transmitted/received by scheduling (for convenience of description, hereinafter referred to as scheduled signals), the eNB has to adjust transmission/reception of access signals in consideration of a backhaul subframe, such that such resource limitation may not cause any problems. However, in case of Tx/Rx signals irrespective of scheduling (for convenience of description, hereinafter referred to as non-scheduled signals), the eNB has limitation in adjusting transmission/reception of the access signal, such that the loss of access signals may occur due to resource limitation caused by the half-duplexing, resulting in reduction in system efficiency. For example, the non-scheduled signal may include periodic transmission control information (for example, SRS, Precoding Matrix Index (PMI), Rank Indicator (RI), Channel Quality Indicator (CQI), etc.) or an uplink ACK/NACK signal, transmission time point of which is implicitly linked to downlink transmission. In more detail, it is impossible for the relay to receive dynamic ACK/NACK signals of an access link at a subframe allocated to a backhaul subframe. Therefore, if the backhaul link is activated, the ACK/NACK for the access link may be lost in the corresponding backhaul subframe, such that system throughput may be unexpectedly decreased. In addition, if a discontinuous transmission (DTX) caused by deactivation of the access link is considered to be NACK, retransmission occurs, resulting in increase in latency.

In order to solve such limitation caused by a half-duplex relay or to efficiently use resources, the present invention proposes a method for using TDM partitioning having more close granularity in a communication link. For example, TDM partitioning granularity for a communication link may be defined as a time unit (e.g., a sampling time (Ts), and symbol- or slot-basis) shorter than a TTI (e.g., a subframe). The present invention can be applied to a backhaul link, an access link or a backhaul link/access link without any limitation. TTI or subframe to which dense granularity TDM is applied may be signaled by a network (e.g., eNB, relay, etc.) or may be a special promised TTI or subframe. The special subframe is not limited thereto, and includes a backhaul subframe. If a Multicast Broadcast Single Frequency Network (MBSFN) is reused as a backhaul subframe, the special subframe (e.g., a backhaul subframe) may be established using MBSFN subframe signaling.

A communication method for performing TDM partitioning with more dense granularity in a wireless communication system which uses a subframe as a basic transmission unit will hereinafter be described with reference to the attached drawings. For better understanding of the present invention, the following description will be focused upon the case in which the present embodiment is applied to a backhaul link (i.e., a communication link between the eNB and the relay) and an access link (i.e., a communication link between the relay and the relay UE) of the relay system. However, the scope or spirit of the above-mentioned description is not limited thereto, and the following drawings and description can also be applied to an access link (i.e., a communication link between the eNB and the UE) including no relay. In addition, a time required for Tx/Rx switching or Rx/Tx switching is not shown in the following drawings. The time required for Tx/Rx switching or the time required for Rx/Tx switching may be changed according to implementation methods. For convenience of description and better understanding of the present invention, the following description assumes communication under a Frequency Division Duplex (FDD) situation.

Figure 8:
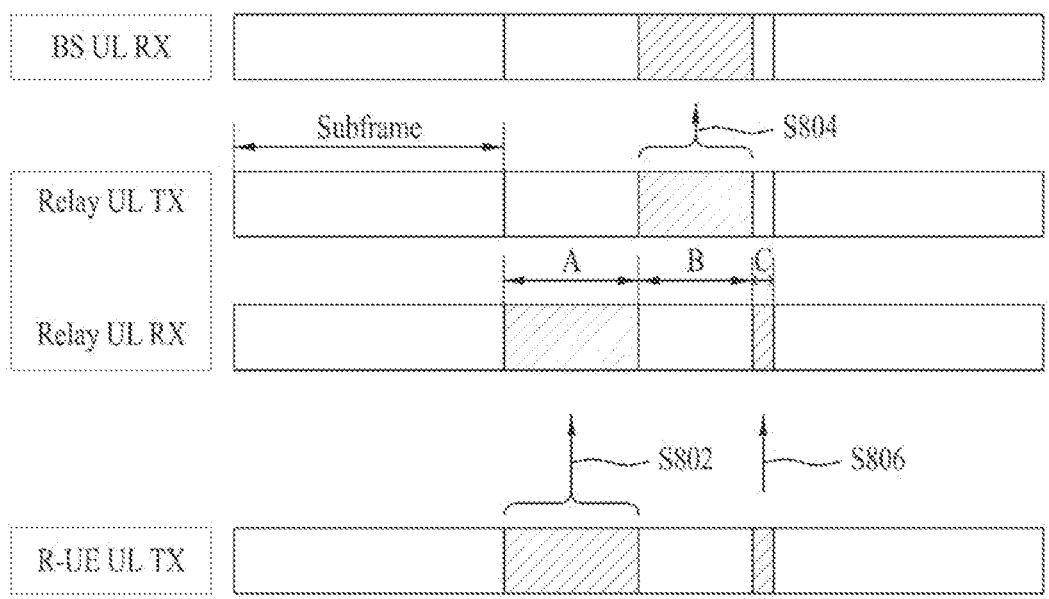
FIGS. 8 to 10 exemplarily show symbol-based partitioning of a backhaul subframe in a time domain according to one embodiment of the present invention.

FIG. 8 exemplarily shows that a backhaul subframe is divided into several units on a symbol basis in a time domain according to one embodiment of the present invention.

Referring to FIG. 8, a backhaul subframe may be divided into an access link A, a backhaul link B, and an access link C in a time domain. Therefore, the UE and the relay may transmit and receive RF signals using a time interval A in which the access link is activated at step S802. Similarly, the UE and the relay may transmit and receive RF signals using a time interval C in which the access link is activated at step S806. In this case, although the corresponding subframe is established as a backhaul subframe, the backhaul link between the relay and the eNB is deactivated in time intervals A and C. On the other hand, the time interval B in which the backhaul link is activated is used for the eNB to transmit/receive a backhaul link signal in response to an original setup of the corresponding subframe at step S804. Time domain partitioning of the backhaul subframe shown in FIG. 8 is disclosed only for illustrative purposes, and the order/length/number of intervals for the access link and the backhaul link may be changed in various ways. FIG. 8 shows that data transmission/reception is achieved in all the three time intervals A, B and C obtained from one subframe. However, the above-mentioned description is disclosed only for illustrative purposes, and each time interval A, B or C may be independently activated or deactivated.

According to the present embodiment, although an arbitrary subframe is established as a backhaul link by a scheduler of a network controller (e.g., some parts of the eNB), some time resources of the corresponding subframe is reused as an access link, such that transmission of the access link signal (preferably, the non-scheduled signal) may be restricted. The non-scheduled signal may include periodic transmission signals or event-based transmission signals. The scope or spirit of the present invention is not limited thereto, and the non-scheduled signal may include a channel measurement signal (e.g., SRS) and uplink control signals (e.g., CQI, PMI, RI, SR (Scheduling Request), ACK/NACK and the like). As described above, access link transmission is restrictively allowed in the backhaul subframe so as to prevent the access link signal from being unexpectedly lost, resulting in an increase of the efficiency of radio resources.

Figure 9:
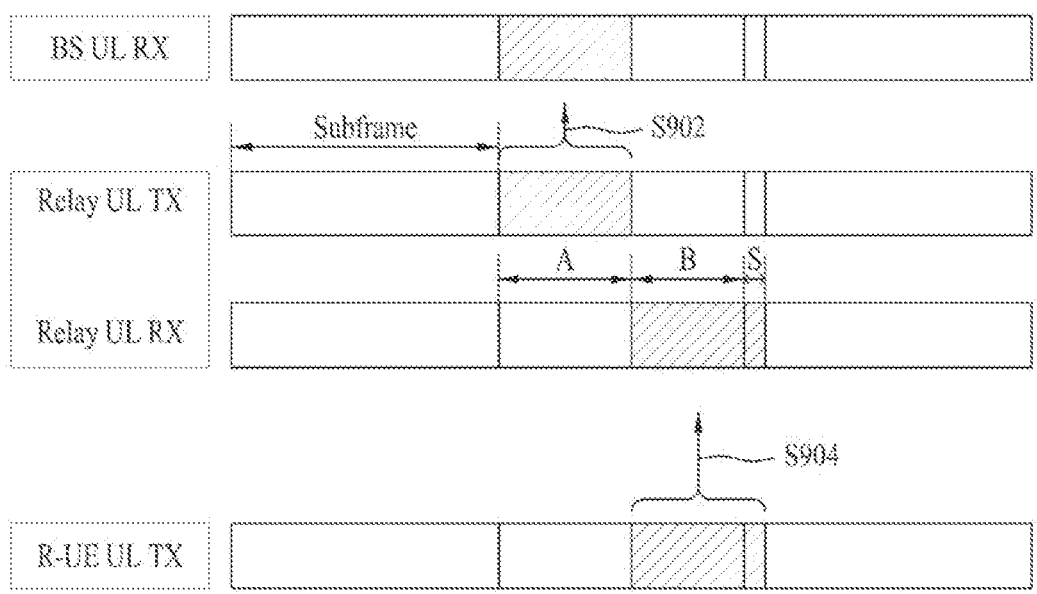

FIG. 9 exemplarily shows that a backhaul subframe is divided into several units on a symbol basis in a time domain according to another embodiment of the present invention.

Referring to FIG. 9, a backhaul subframe may be divided into a backhaul link A and access links (B and S) in a time domain. Therefore, the UE and the relay may transmit and receive RF signals using time intervals (B and S) in which the access link is activated at step S904. Especially, the time interval S acting as a transmission duration for an SRS may be defined as the last one symbol of a subframe in consideration of compatibility with the legacy LTE system. Therefore, according to the present embodiment, although the corresponding subframe is defined as a backhaul subframe, a backhaul link between the relay and the eNB is deactivated in the time intervals (A and S). In contrast, the time interval A in which the backhaul link is activated is used for the relay and the eNB to transmit/receive a backhaul link signal at step S902. Time domain partitioning of the backhaul subframe shown in FIG. 9 is disclosed only for illustrative purposes, and the order/length/number of intervals for the access link and the backhaul link may be changed in various ways. FIG. 9 shows that data transmission/reception is achieved in all the three time intervals A, B and S obtained from one subframe. However, the above-mentioned description is disclosed only for illustrative purposes, and each time interval A, B or S may be independently activated or deactivated.

Figure 10:
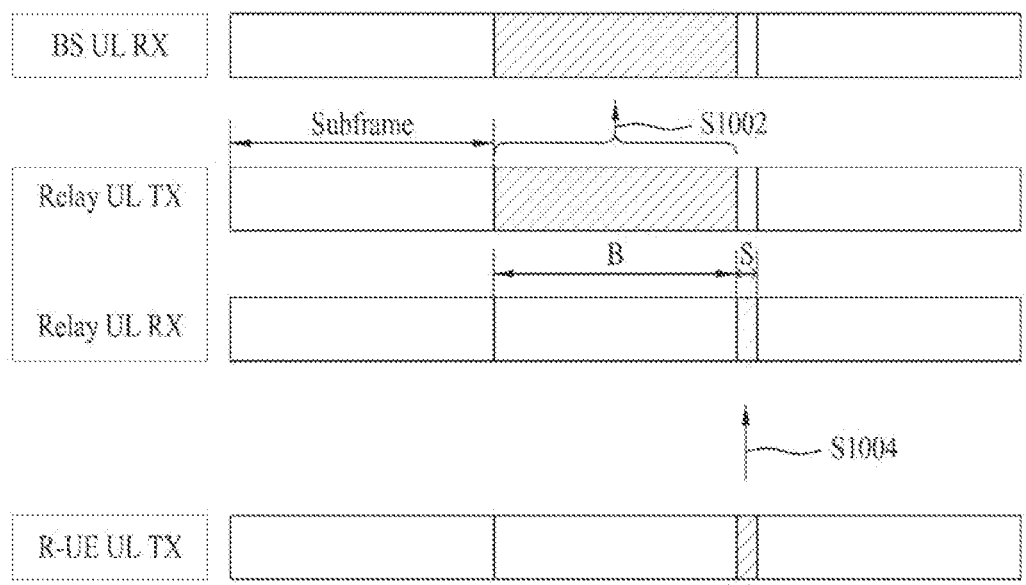

FIG. 10 exemplarily shows that a backhaul subframe is divided into several units on a symbol basis in a time domain according to another embodiment of the present invention.

Referring to FIG. 10, the backhaul subframe may be divided into a backhaul link B and an access link S in a time domain. Therefore, the UE and the relay may transmit and receive RF signals using the time interval S in which the access link is activated at step S1004. Especially, the time interval S acting as a transmission duration for an SRS may be defined as the last one symbol of a subframe. That is, according to the present embodiment, one Tx/Rx switching is allowed on a symbol basis in a backhaul subframe. In this way, switching from the backhaul link to the access link is allowed in units of a symbol, such that the relay can receive the SRS from the UE through the backhaul subframe. In addition, the remaining symbols of the backhaul subframe can be used for backhaul transmission.

Therefore, according to the present embodiment, although the corresponding subframe is established as a backhaul subframe, the backhaul link from the relay to the eNB is deactivated in the time interval S. On the other hand, the time interval B in which the backhaul link is activated is used for communication of a backhaul link signal between the relay and the eNB in response to an original setup of the corresponding subframe at step S1002. Time domain partitioning of the backhaul subframe shown in FIG. 10 is disclosed only for illustrative purposes, and the order/length/number of intervals for the access link and the backhaul link may be changed in various ways. FIG. 10 shows that data transmission/reception is achieved in all the two time intervals B and S obtained from one subframe. However, the above-mentioned description is disclosed only for illustrative purposes, and each time interval B or S may be independently activated or deactivated.

In order to support the above-mentioned schemes shown in FIGS. 8 to 10, signaling information for constructing TDM partitioning with more dense granularity may be needed. Signaling information for constructing TDM partitioning may be newly defined. In this case, the signaling information may semi-statically indicate TDM partitioning configuration within the backhaul subframe using higher layer signaling (e.g., RRC signaling). TDM partitioning according to the present embodiment can be applied to all the non-scheduled signals without any limitation. Preferably, TDM partitioning according to the present embodiment may be limited only to specific non-scheduled signals (e.g., SRS, ACK/NACK, and the like) so as to minimize the influence of conventional backhaul subframes. In this case, TDM partitioning according to the present embodiment may be activated only in a backhaul subframe in which specific non-scheduled signals (e.g., SRS, ACK/NACK, and the like) are transmitted. Meanwhile, although configuration information for TDM partitioning is transmitted through the above-mentioned higher layer signaling, a method for enabling a network node (e.g., eNB, relay, etc.) to dynamically indicate information as to whether TDM partitioning is to be actually applied using lower layer signaling (e.g., MAC signaling, PDCCH signaling, etc.) in consideration of system situations may be used as necessary.

In another example, signaling information prescribed in the legacy LTE is maximally utilized such that the effect caused by subframe partitioning can be minimized. The following description will hereinafter be disclosed centering on SRS transmission. In the legacy LTE system, SRS transmission may be configured by cell-specific parameters and UE-specific transmission parameters. In the case of the relay system, backhaul SRS transmission may also be configured by cell-specific SRS transmission parameters and UE-specific SRS transmission parameters (or relay-specific SRS transmission parameters) in the same or similar manner to the LTE system.

Table 1 shows cell-specific SRS transmission parameters for SRS transmission defined in the LTE, and Table 2 shows UE-specific SRS transmission parameters for SRS transmission defined in the LTE.

TABLE 1

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

$T_{SFC}$ is cell-specific subframe configuration, and $\Delta_{SFC}$ is a cell-specific subframe offset. srs-SubframeConfig is provided through higher layer. SRS is transmitted through a subframe satisfying "floor($n_s$/2)mod $T_{SFC} \in \Delta_{SFC}$". $n_s$ is a slot index. "floor( )" is a flooring function, and "mod" is a modulo operation.

TABLE 2

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-36 | 20 | $I_{SRS}$ − 17 |
| 37-76 | 40 | $I_{SRS}$ − 37 |
| 77-156 | 80 | $I_{SRS}$ − 77 |
| 157-316 | 160 | $I_{SRS}$ − 157 |
| 317-636 | 320 | $I_{SRS}$ − 317 |
| 637-1023 | reserved | reserved |

SRS configuration index ($I_{SRS}$) is signaled to each UE. Each UE confirms the SRS transmission period ($T_{SRS}$) and the SRS subframe offset ($T_{offset}$) using the $I_{SRS}$ value.

The cell-specific SRS transmission parameter may inform the relay and the UE of subframes occupied for SRS transmission within a cell, and the UE-specific SRS transmission parameter may indicate a subframe to be actually used by the corresponding relay/UE from among subframes occupied for SRS. Thereafter, the relay/UE transmits the SRS through a specific symbol (e.g., the last symbol) of a subframe defined as a relay/UE-specific SRS transmission parameter. On the other hand, in order to protect SRS transmission from subframes occupied through cell-specific SRS transmission parameters, the relay/UE need not transmit uplink signals through the last symbol of a subframe irrespective of actual transmission or non-transmission of SRS in the corresponding subframe.

Due to the above-mentioned reasons, in the case of a backhaul subframe (for convenience of description, hereinafter referred to as a special subframe) undefined as the relay-specific SRS transmission parameter from among subframes occupied through the cell-specific SRS transmission parameter, the relay does not perform backhaul link transmission in the SRS transmission region of the corresponding backhaul subframe such that no interference affects SRSs of other relays/UEs. Therefore, in the case of a special subframe, the switching method shown in FIG. 10 may be applied to the special subframe without newly defining signaling information for constructing TDM partitioning.

On the other hand, some uplink control signals (e.g., ACK/NACK, SR, etc.) may have a higher protection priority order than the SRS. As a result, if PUCCH and SRS for ACK/NACK signals are configured in the same subframe, two options (i.e., PUCCH/SRS simultaneous transmission and SRS transmission drop) may be made available. For operation selection, LTE transmits ackNackSrsSimultaneousTransmission through RRC signaling. If AckNackSrsSimultaneousTransmission is switched on, PUCCH/SRS simultaneous transmission is allowed. Otherwise, if AckNackSrsSimultaneousTransmission is switched off, the SRS is dropped. Therefore, more specifically, the present embodiment can apply the above-mentioned switching methods shown in FIGS. 8 to 10 to the aforementioned special subframe only when PUCCH and SRS simultaneous transmission (preferably, simultaneous transmission of PUCCH and SRS for ACK/NACK) are allowed. If PUCCH and SRS simultaneous transmission is allowed, uplink control information is transmitted using the shortened subframe format (or the shortened PUCCH format).

Figure 11:
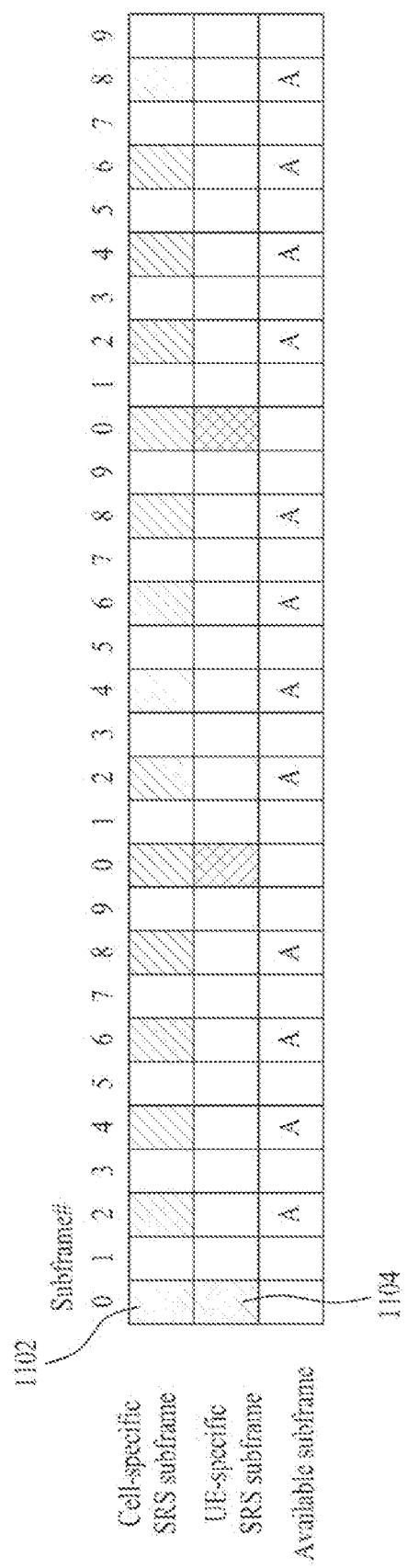
FIG. 11 shows exemplary configuration of a subframe in which TDM partitioning is performed according to one embodiment of the present invention.

FIG. 11 shows exemplary configuration of a subframe in which TDM partitioning is performed according to one embodiment of the present invention.

Referring to FIG. 11, the cell-specific SRS subframes 1102 start from the 0-numbered subframe and are arranged at intervals of two subframes. In the meantime, the UE-specific SRS subframes 1104 start from the 0-numbered subframe and are arranged at intervals of 10 subframes. In this case, the UE-specific SRS subframes may indicate SRS transmission subframes established for the relay. The relay has to transmit its own backhaul SRS in the UE-specific SRS subframe. Therefore, the UE-specific SRS subframes from among backhaul subframes may be excluded from TDM partitioning purposes. In other words, the UE-specific SRS subframes from among the backhaul subframes may be excluded from purposes receiving the access link signals (e.g., non-scheduled signals: ACK/NACK, SRS, etc.).

In the meantime, cell-specific SRS subframes from among the backhaul subframes are established. In the case of subframes (i.e., special subframes) A not corresponding to the UE-specific SRS subframes, the relay may use the shortened subframe format because of the cell-specific SRS configuration, such that it can receive access link signals (e.g., non-scheduled signals: ACK/NACK, SRS, etc.) through TDM partitioning. In association with the above-mentioned description, Tx/Rx switching for TDM partitioning within the special subframe may be limited only to the case in which PUCCH and SRS simultaneous transmission (preferably, simultaneous transmission of PUCCH and SRS for ACK/NACK) are allowed. (For example, ackNackSrsSimultaneousTransmission=ON).

From the viewpoint of a UE, the UE may allocate resources (or channels) for an uplink signal in the case in which the UE has to transmit uplink signals (e.g., non-scheduled signals: ACK/NACK, SRS, etc.) at the backhaul subframe. In this case, if the backhaul subframe belongs to a set of cell-specific SRS transmission subframes and does not belong to a set of relay-specific SRS transmission subframes (i.e., if the backhaul subframe is determined to be a special subframe), the UE may transmit signals (e.g., non-scheduled signals: ACK/NACK, SRS, etc.) through the backhaul subframe. In contrast, if the backhaul subframe belongs to the set of relay-specific SRS transmission subframes, the UE may drop signal transmission from the backhaul subframe to the relay.

Figure 12:
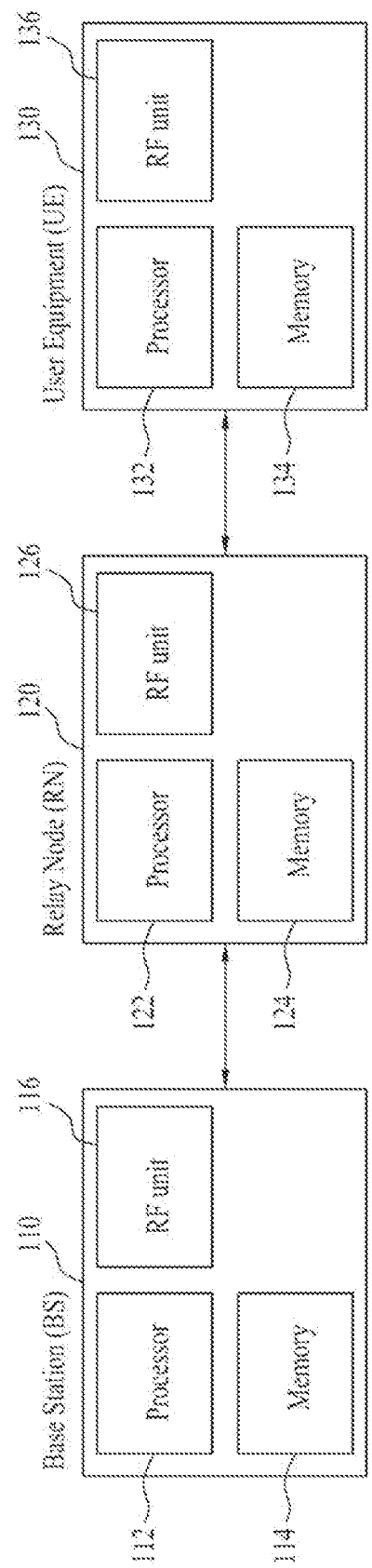
FIG. 12 is a block diagram illustrating a Base Station (BS), a relay and a user equipment (UE) applicable to the embodiments of the present invention.

FIG. 12 is a block diagram illustrating a base station (BS), a relay and a user equipment (UE) applicable to the embodiments of the present invention.

Referring to FIG. 12, a wireless communication system includes a BS 110, a relay node (RN) 120, and a UE 130. In backhaul downlink, a transmitter may be a part of the BS 110, and a receiver may be a part of the relay node (RN) 120. In backhaul uplink, a transmitter may be a part of the RN 120, and a receiver may be a part of the BS 110. In access downlink, a transmitter may be a part of the BS 110 or the RN 120. In access uplink, a transmitter may be a part of the UE 130, and a receiver may be a part of the 110 or the RN 120. In case of a macro UE 130, a link between the BS 110 and the UE 130 is formed. In case of the relay UE 130, a link between the RN 120 and the UE 130 is formed.

The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The RN 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The UE 130 includes a processor 132, a memory 134, and an RF unit 136. The processor 132 may be constructed to implement the procedures and/or methods disclosed in the embodiments of the present invention. The memory 134 may be connected to a processor 132, and store various information related to operations of the processor 132. The RF unit 136 is connected to the processor 132, and transmits and/or receives RF signals. The BS 110, the RN 120, and/or the UE 130 may include a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a base station and a user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations as described above. Software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Exemplary embodiments of the present invention can be applied to a wireless communication system. In more detail, the exemplary embodiments of the present invention can be applied to a wireless communication system including a relay node (RN).

The invention claimed is:

1. A method for controlling uplink signal transmission of a user equipment (UE) in a wireless communication system, the method comprising:
    confirming a cell-specific first sounding reference signal (SRS) transmission subframe set;
    confirming a relay-specific second SRS transmission subframe set; and
    allocating resources for the uplink signal transmission,
    wherein, if a backhaul subframe is contained in the first SRS transmission subframe set and is not contained in the second SRS transmission subframe set, the uplink signal is transmitted to the relay through the backhaul subframe, and
    if the backhaul subframe is contained in the second SRS transmission subframe set, transmission of the uplink signal is dropped in the backhaul subframe.

2. The method according to claim 1, wherein the uplink signal includes acknowledgement (ACK)/negative ACK (NACK) or Sounding Reference Signal (SRS).

3. The method according to claim 1, wherein the uplink signal is transmitted to the relay through a time interval located at the rear of the backhaul subframe.

4. The method according to claim 3, wherein the uplink signal includes an SRS interval of the backhaul subframe.

5. A user equipment (UE) for use in a wireless communication system comprising:
    a radio frequency (RF) unit;
    a memory; and
    a processor,
    wherein the processor confirms a cell-specific first sounding reference signal (SRS) transmission subframe set, confirms a relay-specific second SRS transmission subframe set, and allocates resources for the uplink signal transmission,
    wherein, if a backhaul subframe is contained in the first SRS transmission subframe set and is not contained in the second SRS transmission subframe set, the uplink signal is transmitted to the relay through the backhaul subframe, and
    if the backhaul subframe is contained in the second SRS transmission subframe set, transmission of the uplink signal is dropped in the backhaul subframe.

6. The user equipment (UE) according to claim 5, wherein the uplink signal includes acknowledgement (ACK)/negative ACK (NACK) or Sounding Reference Signal (SRS).

7. The user equipment (UE) according to claim 5, wherein the uplink signal is transmitted to the relay through a time interval located at the rear of the backhaul subframe.

8. The user equipment (UE) according to claim 7, wherein the uplink signal includes an SRS interval of the backhaul subframe.

9. A method for controlling signal transmission/reception of a relay node (RN) in a wireless communication system, the method comprising:
confirming a cell-specific first sounding reference signal (SRS) transmission subframe set; and
confirming a relay-specific second SRS transmission subframe set,
wherein, if a backhaul subframe is contained in the first SRS transmission subframe set and is not contained in the second SRS transmission subframe set, a signal from a user equipment (UE) is received through the backhaul subframe, and
if the backhaul subframe is contained in the second SRS transmission subframe set, a sounding reference signal (SRS) is transmitted to a base station (BS) through the backhaul subframe.

10. The method according to claim 9, wherein the signal received from the user equipment (UE) includes acknowledgement/negative ACK (ACK/NACK) or Sounding Reference Signal (SRS).

11. The method according to claim 9, wherein the signal is transmitted to the relay node (RN) through a time interval located at the rear of the backhaul subframe.

12. The method according to claim 11, wherein the signal includes an SRS interval of the backhaul subframe.

13. The method according to claim 9, further comprising:
performing, if the backhaul subframe is contained in the first SRS transmission subframe set and is not contained in the second SRS transmission subframe set, switching from a backhaul link to an access link within the backhaul subframe.

14. The method according to claim 13, wherein a signal on the backhaul link is transmitted to the base station (BS) using a shortened subframe format.

15. A relay node (RN) for use in a wireless communication system comprising:
a radio frequency (RF) unit;
a memory; and
a processor,
wherein the processor confirms a cell-specific first sounding reference signal (SRS) transmission subframe set, and confirms a relay-specific second SRS transmission subframe set,
wherein, if a backhaul subframe is contained in the first SRS transmission subframe set and is not contained in the second SRS transmission subframe set, a signal from a user equipment (UE) is received through the backhaul subframe, and
if the backhaul subframe is contained in the second SRS transmission subframe set, a sounding reference signal (SRS) is transmitted to a base station (BS) through the backhaul subframe.

16. The relay node (RN) according to claim 15, wherein the signal received from the user equipment (UE) includes acknowledgement/negative ACK (ACK/NACK) or Sounding Reference Signal (SRS).

17. The relay node (RN) according to claim 15, wherein the signal is transmitted to the relay node (RN) through a time interval located at the rear of the backhaul subframe.

18. The relay node (RN) according to claim 17, wherein the signal includes an SRS interval of the backhaul subframe.

19. The relay node (RN) according to claim 15, wherein:
if the backhaul subframe is contained in the first SRS transmission subframe set and is not contained in the second SRS transmission subframe set, switching from a backhaul link to an access link is performed in the backhaul subframe.

20. The relay node (RN) according to claim 19, wherein a signal on the backhaul link is transmitted to the base station (BS) using a shortened subframe format.

* * * * *